(12) United States Patent
Hirabayashi

(10) Patent No.: US 10,432,051 B2
(45) Date of Patent: Oct. 1, 2019

(54) DC MOTOR AND METHOD OF MANUFACTURING THE SAME

(71) Applicant: DENSO CORPORATION, Kariya, Aichi-pref. (JP)

(72) Inventor: Takashi Hirabayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 456 days.

(21) Appl. No.: 15/210,626

(22) Filed: Jul. 14, 2016

(65) Prior Publication Data
US 2017/0025910 A1  Jan. 26, 2017

(30) Foreign Application Priority Data
Jul. 22, 2015  (JP) .................................. 2015-144564

(51) Int. Cl.
| | | |
|---|---|---|
| *H02K 1/00* | (2006.01) | |
| *H02K 3/04* | (2006.01) | |
| *H02K 1/08* | (2006.01) | |
| *H02K 1/14* | (2006.01) | |
| *H02K 23/26* | (2006.01) | |
| *H02K 3/18* | (2006.01) | |
| *H02K 15/04* | (2006.01) | |
| *H02K 5/14* | (2006.01) | |
| *H02K 13/00* | (2006.01) | |

(52) U.S. Cl.
CPC .................. *H02K 3/04* (2013.01); *H02K 1/08* (2013.01); *H02K 1/14* (2013.01); *H02K 1/148* (2013.01); *H02K 3/18* (2013.01); *H02K 15/04* (2013.01); *H02K 23/26* (2013.01); *H02K 5/148* (2013.01); *H02K 13/006* (2013.01)

(58) Field of Classification Search
CPC .................................... H02K 3/18; H02K 3/04
USPC ........................................... 310/179, 180, 71
See application file for complete search history.

(56) References Cited

U.S. PATENT DOCUMENTS

| | | | |
|---|---|---|---|
| 4,131,988 A * | 1/1979 | Finegold .................. | H02K 3/18 140/92.2 |
| 4,446,393 A * | 5/1984 | Finegold .................. | H02K 3/18 310/184 |
| 6,107,718 A | 8/2000 | Schustek et al. | |
| 7,249,965 B2 * | 7/2007 | Hasegawa ........... | F02N 11/0859 439/516 |

(Continued)

FOREIGN PATENT DOCUMENTS

| | | |
|---|---|---|
| FR | 581944 A | 12/1924 |
| JP | 2007-097245 A | 4/2007 |
| JP | 2011-223652 A | 11/2011 |

*Primary Examiner* — Hanh N Nguyen
(74) *Attorney, Agent, or Firm* — Oliff PLC

(57) ABSTRACT

A DC motor includes a cylindrical yoke constituting a magnetic path, pole cores fixed to an inner periphery of the yoke so as to be arranged at even intervals along a circumferential direction of the yoke, and a field conductor that generates a magnetic field to magnetize the pole cores when supplied with a current. The field conductor includes inter-core conductors each of which extends in an axial direction of the yoke so as to be disposed between circumferentially adjacent pole cores. Each of the inter-core conductors is formed by integrating a first conductor part that generates a magnetic field to be applied to one of the circumferentially adjacent pole cores and a second conductor part that generates a magnetic field to be applied to the other of the circumferentially adjacent pole cores.

27 Claims, 8 Drawing Sheets

(56) References Cited

U.S. PATENT DOCUMENTS

| | | |
|---|---|---|
| 2005/0258704 A1 | 11/2005 | Oohashi et al. |
| 2007/0063597 A1* | 3/2007 | Nito ........................ H02K 3/522 |
| | | 310/68 C |
| 2008/0179983 A1 | 7/2008 | Hasegawa et al. |
| 2010/0170084 A1 | 7/2010 | Hasegawa et al. |
| 2010/0187936 A1 | 7/2010 | Hasegawa et al. |
| 2011/0050025 A1 | 3/2011 | Doushita et al. |
| 2013/0026877 A1 | 1/2013 | Matsuda et al. |
| 2013/0140477 A1 | 6/2013 | Shimane |

* cited by examiner

FIRST LAYER

SECOND LAYER

THIRD LAYER

DC MOTOR AND METHOD OF MANUFACTURING THE SAME

This application claims priority to Japanese Patent Application No. 2015-144564 filed on Jul. 22, 2015, the entire contents of which are hereby incorporated by reference.

The present invention relates to a field winding type motor.

DESCRIPTION OF RELATED ART

Generally, to provide a compact and high-output motor, it is necessary to employ regular wound coils to increase the space factor. Japanese Patent No. 4811286 describes a coil winding technique in which a leading part of a coil does not obstruct regularly winding the coil. Specifically, this patent document describes an edgewise-wound field coil formed by winding a square wire having a rectangular cross section in the width direction (in the long-side direction).

However, the edgewise-wound field coil as described in this patent document still has a problem in that it is necessary to leave a space between adjacent field coils for avoiding interference therebetween, and accordingly, the space factor is reduced.

SUMMARY

An exemplary embodiment provides a DC motor including:
a cylindrical yoke constituting a magnetic path;
pole cores fixed to an inner periphery of the yoke so as to be arranged at even intervals along a circumferential direction of the yoke; and
a field conductor that generates a magnetic field to magnetize the pole cores when supplied with a current, wherein
the field conductor includes inter-core conductors each of which extends in an axial direction of the yoke so as to be disposed between the circumferentially adjacent pole cores,
each of the inter-core conductors being formed by integrating a first conductor part that generates a magnetic field to be applied to one of the circumferentially adjacent pole cores and a second conductor part that generates a magnetic field to be applied to the other of the circumferentially adjacent pole cores.

According to the exemplary embodiment, there is provided a compact and high-output DC motor whose space factor in the field conductor is increased.

Other advantages and features of the invention will become apparent from the following description including the drawings and claims.

PREFERRED EMBODIMENTS OF THE INVENTION

First Embodiment

Figure 2:
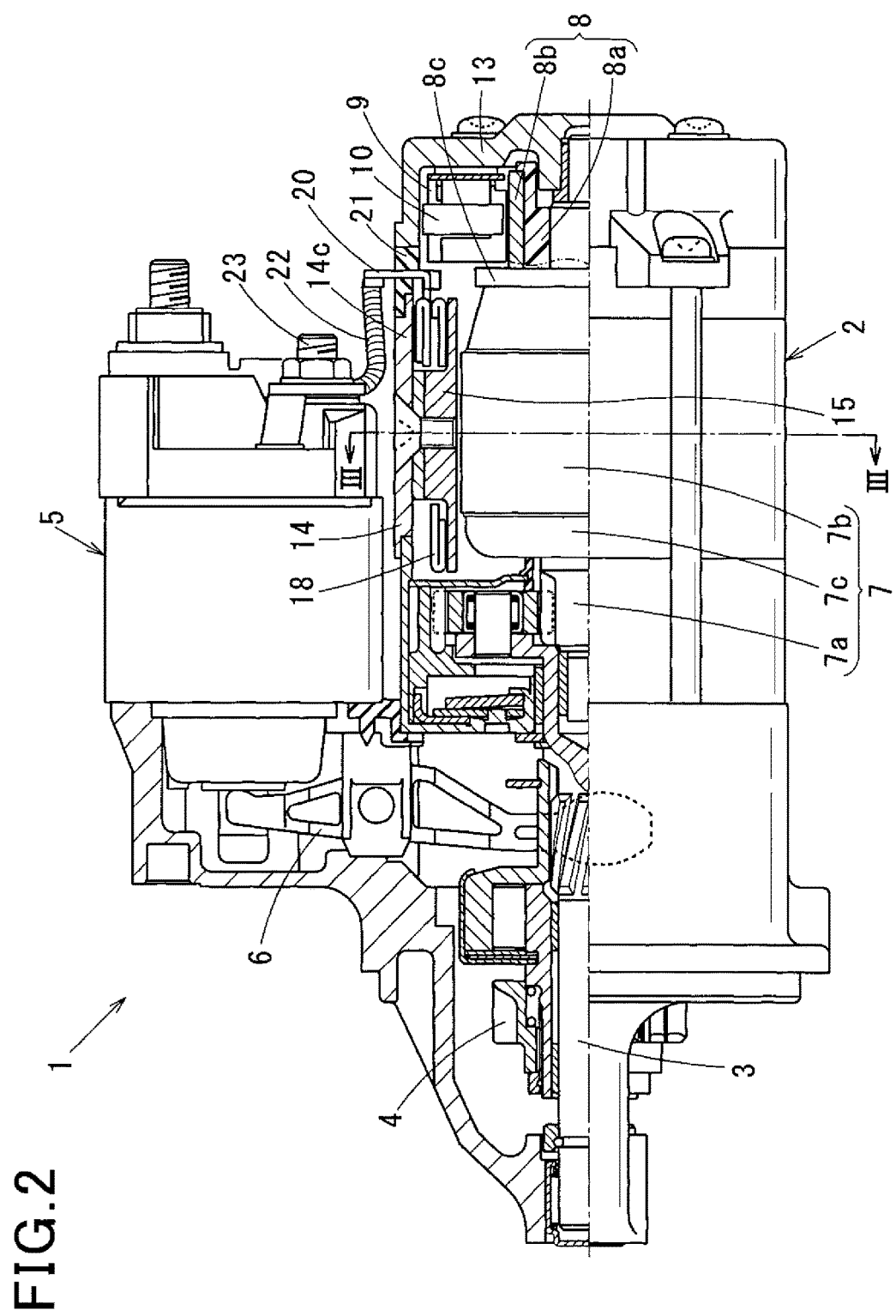
FIG. 2 is a cross-sectional view of a starter including the DC motor according to the first embodiment of the invention.
Figure 5:
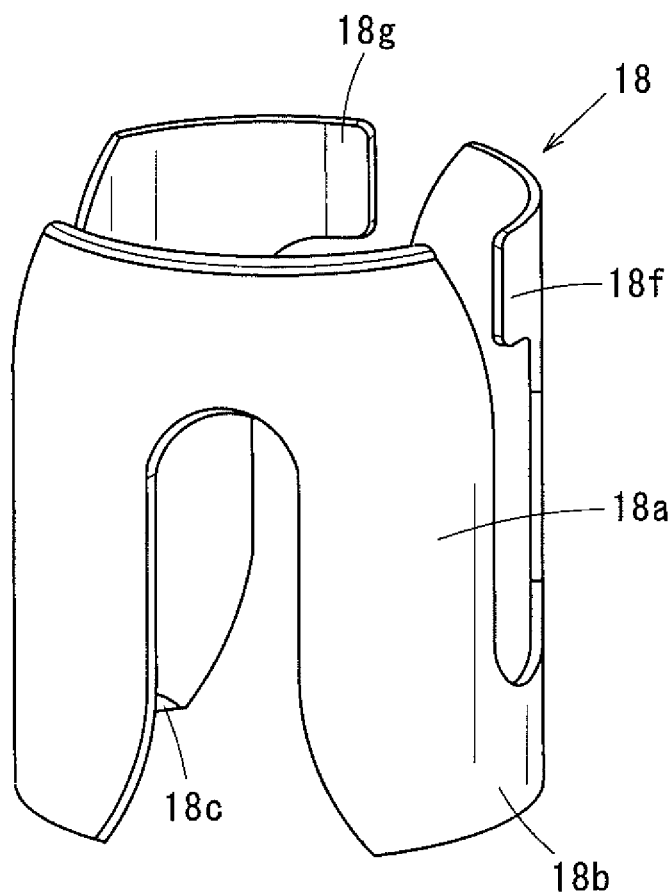
FIG. 5 is a perspective view of the second-layer coil conductor.
Figure 6:
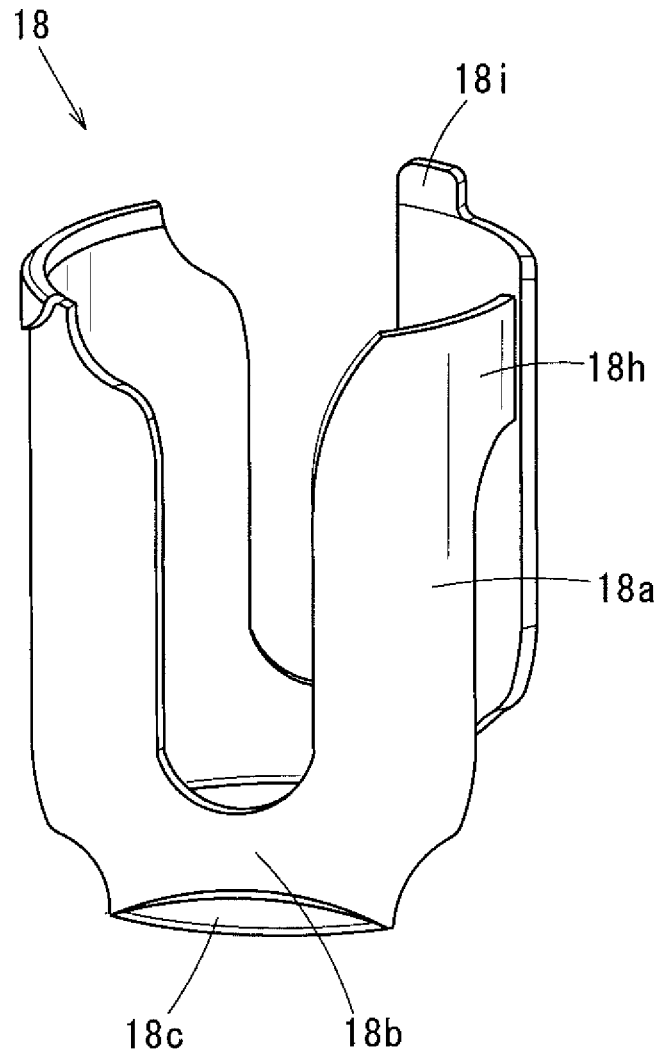
FIG. 6 is a perspective view of the third-layer coil conductor.

FIG. 2 is a cross-sectional view of a starter including a starter motor 2 as a DC motor according to a first embodiment of the invention. As shown in FIG. 2, the starter 1 includes an output shaft 3 driven to rotate by the motor 2, a pinion 4 mounted on the shaft 3, a lever 6 and an electromagnetic switch 5. The starter 1 is of the so-called "pinion-enmeshing type" in which the lever 6 is driven by the attraction force of the electromagnetic switch 5 to push out the pinion 4 toward a not-shown ring gear of an engine (toward the left side of FIG. 5). Since the structure of such a starter of the pinion-enmeshing type is well known, the motor 2 is described in detail in the following.

Figure 3:
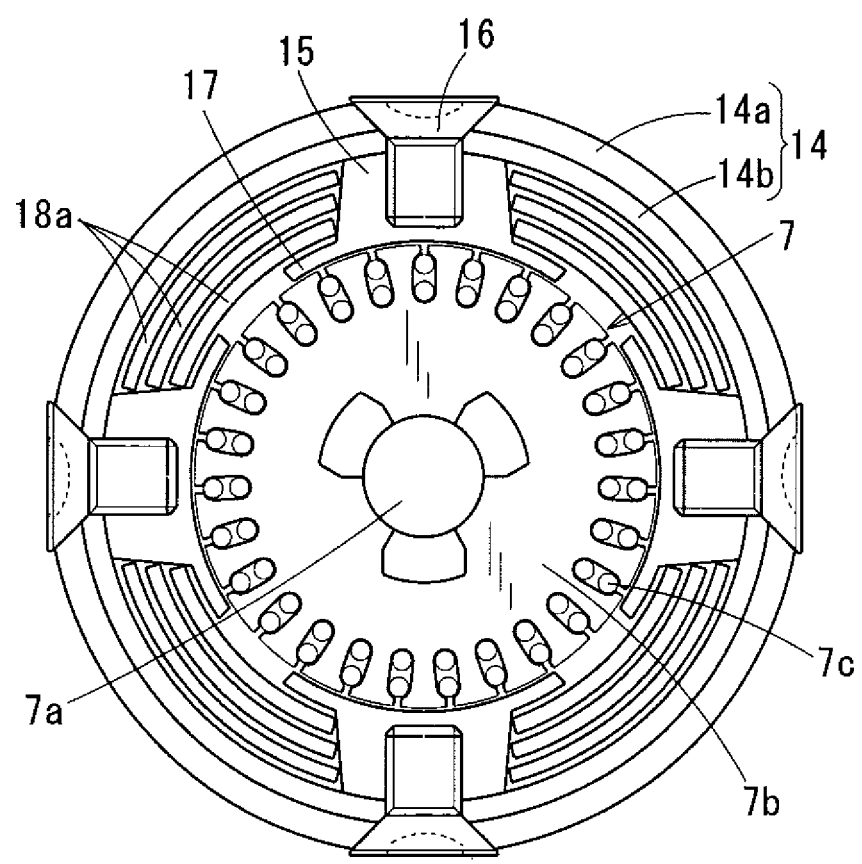
FIG. 3 is a cross-sectional view of FIG. 2 taken along line III-III.
Figure 4:
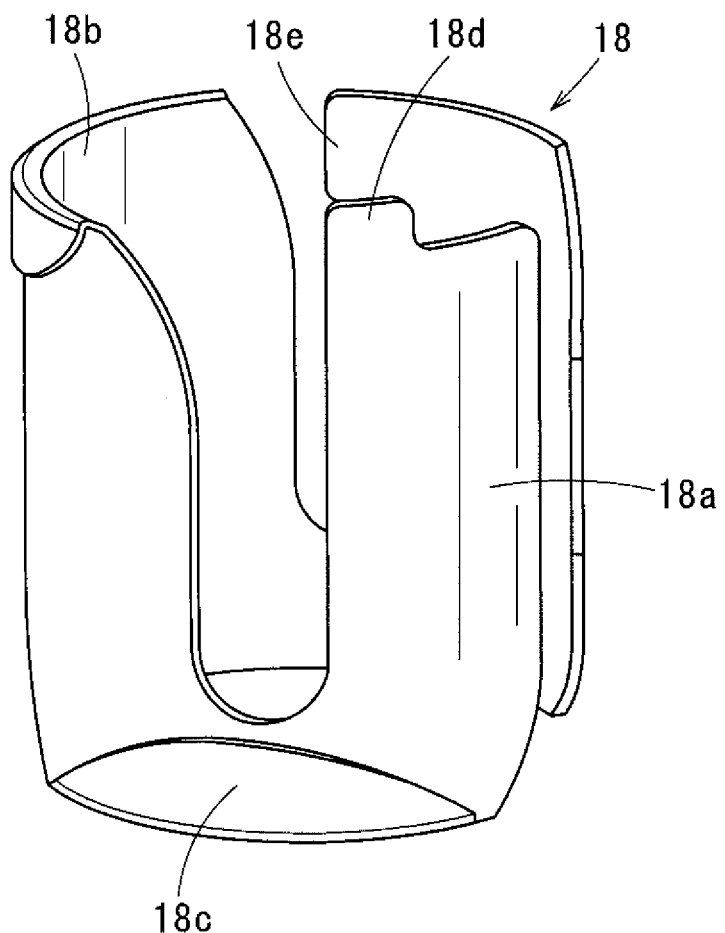
FIG. 4 is a perspective view of the first-layer coil conductor.

The motor 2 includes a field device of the electromagnet type, an armature 7 rotatably disposed at the inner circumference of the field device, a commutator 8 mounted on the shaft of the armature 7, and brushes 9 disposed at the outer circumference of the commutator 8. As shown in FIG. 3, the armature 7 includes an armature shaft 7a, an armature core 7b fitted to the outer periphery of the armature shaft 7a and an armature coil 7c wound in the slots formed in the armature core 7b. FIG. 3 is a cross-sectional view of FIG. 2 taken along line III-III. The commutator 8 includes a cylindrical insulator base 8a made of insulating material such as resin, and commutator segments 8b held by the insulator base 8a so as to be arranged in a cylindrical form. The insulator base 8a is press-fitted onto the outer circumference of one end of the armature shaft 8a. The commutator segments 8b are insulated from one another by the insulator base 8a. The armature coil 7c is connected to a riser 8c disposed at the axial end of the insulator base 8a.

Figure 7:
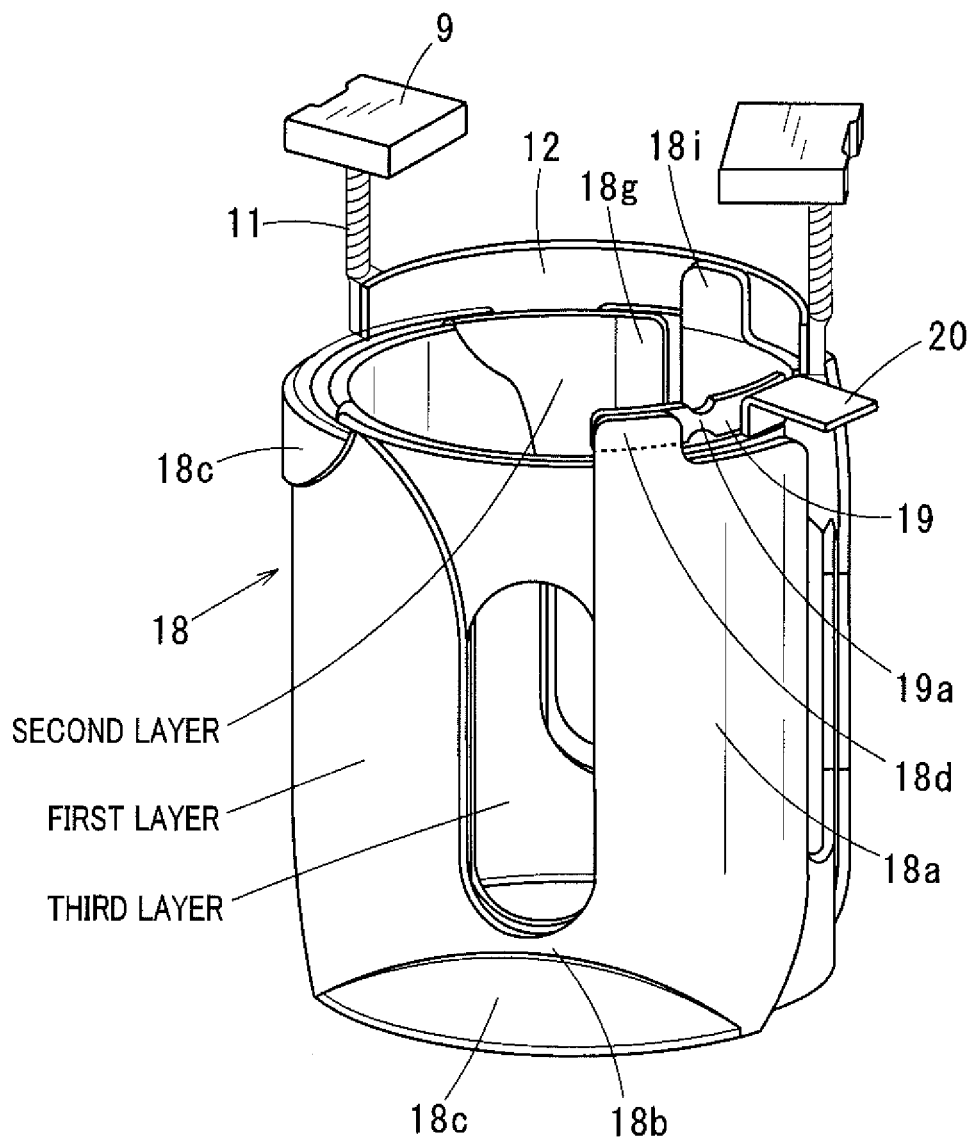
FIG. 7 is a perspective view of a field conductor of the DC motor according to the first embodiment of the invention.

In this embodiment, the brushes 9 are four in number and disposed along the circumference of the commutator 8. These brushes 9 are pressed against the outer peripheries of the commutator segments 8b by brush springs 10. As shown in FIG. 7, of the four brushes 9, two positive brushes 9 are connected to a connection bar 12 through pigtails 11. On the other hand, two negative brushes 9 (not shown) are grounded through an end frame 13 of the motor 2, which forms a part of a ground circuit. In this embodiment, although the brush spring 10 is a flat spring, it may be a coil spring. As shown in FIG. 3, the field device includes a cylindrical yoke 14 constituting a magnetic circuit, pole cores 15 fixed to the inner periphery of the yoke 14, and a field conductor which generates a magnetic field to magnetize the pole cores 15 when supplied with a current.

The yoke 14 is constituted of an outer yoke 14a and an inner yoke 14b which are joined on top of each other in the radial direction. The outer yoke 14a and the inner yoke 14b are manufactured individually by rounding each of two steel plates into a cylindrical shape. The inner yoke 14b is smaller in thickness and axial length than the outer yoke 14b. The axial length of the inner yoke 14b is approximately the same as that of the pole cores 15 (see FIG. 2). That is, the inner yoke 14b is disposed so as to extend over the axial area in which the pole cores 15 are disposed.

The axial ends of the outer yoke 14a project in the axial direction from the ends of the inner yoke 14b. In the following, the portions of the outer yoke 14a, which project in the axial direction from the ends of the inner yoke 14b are referred to as an extended part 14c (see FIG. 2). In this embodiment, the yoke 14 includes a first magnetic path part having a large cross-sectional area formed by the overlapping of the outer yoke 14a and the inner yoke 14b, and a second magnetic path part having a small cross-sectional area formed by the extended part 14c of the outer yoke 14a. Between the first magnetic path part and the second magnetic path part, there is provided a radial step. In the following, the space formed axially outward from the radial step, that is, the space formed at the inner circumference of the extended part 14c is referred to as the "stepped space".

Figure 1:
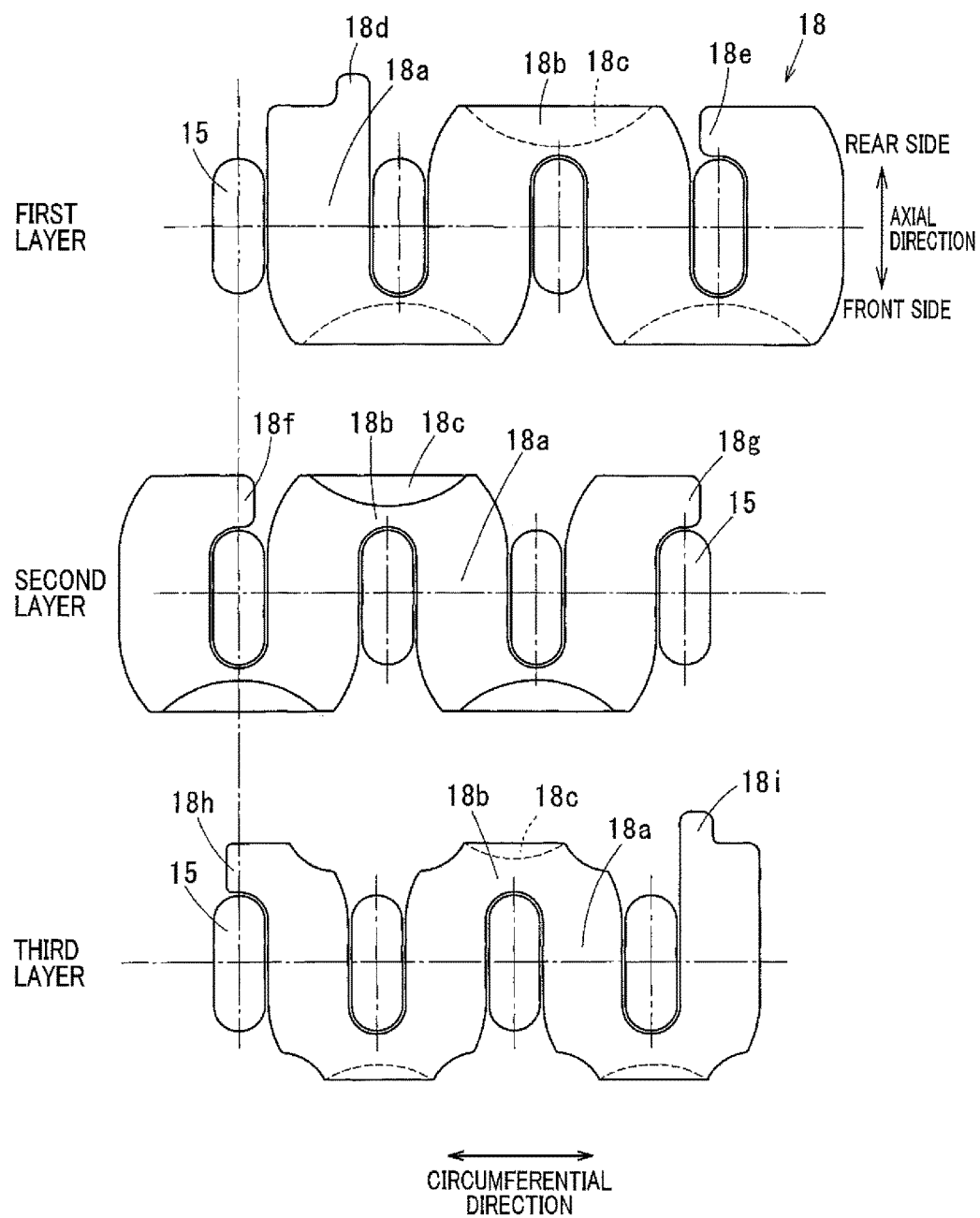
FIG. 1 is a development view showing a first-layer coil conductor, a second-layer coil conductor and a third-layer coil conductor of a starter motor as a DC motor according to a first embodiment of the invention.

As shown in FIG. 3, the pole cores 15 are four in number and fixed to the inner periphery of the yoke 14 by screws 16 so as to be located at four evenly spaced positions along the inner circumference of the yoke 14. As shown in FIG. 1, the cross-sectional shape of the pole core 15 in the direction perpendicular to the radial direction is an elongated circle in which the length in the axial direction (in the vertical direction in FIG. 1) is larger than the width in the circumferential direction (in the horizontal direction in FIG. 1). The width in the circumferential direction of the pole core 15 is approximately constant or increases gradually from the side facing the yoke 14 toward the side opposite to the yoke 14 in the radial direction. As shown in FIG. 3, the pole core 15 is integrally provided with a brim part 17 at its radial end on the opposite-yoke side. The brim part 17 has a circular arc shape along the circumferential direction in the cross section in the direction perpendicular to the axial direction, and is disposed so as to form a small air gap with the outer periphery of the armature core 7b. In the following, the words "pole core 15" do not include the brim part 17.

The field conductor includes three coil conductors 18 of first to third layers (the first-layer coil conductor 18, the second-layer coil conductor 18 and the third-layer coil conductor 18) which are stacked in the radial direction. As shown in FIG. 1, each coil conductor 18 includes inter-core conductors 18a each disposed so as to extend in the axial direction between two adjacent pole cores 15, and U-shaped bottom parts 18b each joining two adjacent inter-core conductors 18a in a U-shape. The coil conductor 18 may be formed by edgewise-winding, or cutting and pressing a conductive plate member (copper plate member, for example) having a rectangular cross section into a predetermined shape. In the case where the coil conductor 18 is formed by performing cutting and pressing processes, electric insulating treatment is preferably made after completion of the cutting and pressing processes, because an insulation film of a plate member may be damaged during the cutting and pressing processes. The electric insulating treatment may be insulation coating in which insulating resin powder is applied to the surface of a plate member.

The inter-core conductor 18a is formed by integrating a conductor part for generating magnetic field to be applied to one of the adjacent pole cores 15 and another conductor part for generating magnetic field to be applied to the other pole core 15. As shown in FIG. 3, the inter-core conductor 18a has a circumferential width larger than the circumferential distance between the brim parts 17 of the two adjacent pole cores 15, and circumferentially overlaps with one of these brim parts 17 at its one circumferential end and circumferentially overlaps with the other brim part 17 at its other circumferential end. More specifically, the circumferential width of the inter-core conductor 18a is approximately the same as the circumferential distance between the two adjacent pole cores 15, so that the inter-core conductor 18a is disposed closely between the two adjacent pole cores 15.

In the following, the four pole cores 15 of each layer shown in FIG. 1 are referred to as the first pole core 15, the second pole core 15, the third pole core 15 and fourth pole core 15, respectively, in the order from left to right in FIG. 1. For each of these pole cores 15, the upper side and the lower side in FIG. 1 are defined as a rear side and front side, respectively. Further, the three coil conductors 18 stacked in the radial direction are referred to as the first-layer coil conductor 18, the second-layer coil conductor 18 and the third layer-coil conductor 18 in the order from radially outside to inside. FIG. 1 shows the coil conductus 18 of the respective layers developed in the circumferential direction and viewed from the radially inner side.

The first-layer coil conductor 18 is comprised of the inter-core conductors 18a, respective adjacent two of them being joined by the U-shaped bottom parts 18b at the front side of the second pole core 15, or the rear side of the third pole core 15, or the front side of the fourth pole core 15. As shown by the broken line in FIG. 1, each U-shaped bottom part 18b is bent to the radially outside (to the back side in FIG. 1). In the following, the bent portion of the U-shaped bottom part 18b is referred to as a bent portion 18c. The inter-core conductor 18a disposed between the first pole core 15 and the second pole core 15 is formed with a projection 18d which projects in the axial direction toward the end on the side opposite to the U-shaped bottom part 18b. This projection 18d serves as a junction part for joining with a later-explained fusion member 19 (see FIG. 7). The inter-core conductor 18a disposed between the fourth pole core 15 and the fifth pole core 15 is provided with a junction part 18e for joining with the second-layer coil conductor 18. This junction part 18e is formed by bending the inter-core conductor 18a toward the circumferential center of the fourth pole core 15 at the side opposite to the U-shaped bottom part 18b.

The second-layer coil conductor 18 is comprised of the inter-core conductors 18a, respective adjacent two of them being joined by the U-shaped bottom parts 18b at the front side of the first pole core 15, or the rear side of the second pole core 15, or the front side of the third pole core 15. As shown by the solid line in FIG. 1, each U-shaped bottom part 18b is bent to the radially inside (to the front side in FIG. 1) to form the bent portion 18c. The inter-core conductor 18a disposed between the fourth pole core 15 and the first pole core 15 is provided with a junction part 18f for joining with the third-layer coil conductor 18. This junction part 18f is formed by bending the inter-core conductor 18a toward the circumferential center of the first pole core 15 at the side opposite to the U-shaped bottom part 18b. The inter-core conductor 18a disposed between the third pole core 15 and the fourth pole core 15 is provided with a junction part 18g for joining with the first-layer coil conductor 18. This junction part 18g is formed by bending the inter-core conductor 18a toward the circumferential center of the fourth pole core 15 at the side opposite to the U-shaped bottom part 18b.

The third-layer coil conductor 18 is comprised of the inter-core conductors 18a, respective adjacent two of them being joined by the U-shaped bottom parts 18b at the front side of the second pole core 15, or the rear side of the third pole core 15, or the front side of the fourth pole core 15. As shown by the broken line in FIG. 1, each U-shaped bottom part 18b is bent to the radially outside to form the bent portion 18c. The inter-core conductor 18a disposed between the first pole core 15 and the second pole core 15 is provided with a junction part 18h for joining with the second-layer coil conductor 18. This junction part 18h is formed by bending the inter-core conductor 18a toward the circumferential center of the first pole core 15 at the side opposite to the U-shaped bottom part 18b. The inter-core conductor 18a disposed between the fourth pole core 15 and the first pole core 15 is formed with a projection 18i which projects in the axial direction toward the end on the side opposite to the U-shaped bottom part 18b. This projection 18I serves as a junction part for joining with the connection bar 12.

The junction part 18e of the first-layer coil conductor 18 and the junction part 18g of the second-layer coil conductor 18 is joined by welding or the like. The junction part 18f of the second-layer coil conductor 18 and the junction part 18h of the third-layer coil conductor 18 are joined by welding or the like. That is, the coil conductors 18 of the first to third layers are connected in series to form the filed conductor. This field conductor is such that the projection 18d provided in the first-layer coil conductor 18 is connected to a drawing member 20 of the motor 2 through the fusion member 19, and the projection 18i provided in the third-layer coil conductor 18 is connected to the connection bar 12. As shown in FIG. 3, the coil conductors 18 of the respective layers are formed such that the plate thicknesses (the thicknesses in the radial direction) and the circumferential width of their inter-core conductors 18 are different from one another. Specifically, the radially outer coil conductor 18 is smaller in plate thickness and larger in circumferential width than the radially inner coil conductor 18. That is, the inter-core conductors 18a of the first-layer coil conductor 18 are smaller in plate thickness and larger in circumferential width than those of the second-layer coil conductor 18, and the inter-core conductors 18a of the second-layer coil conductor 18 are smaller in plate thickness and larger in circumferential width than those of the third-layer coil conductor 18.

For the first-layer and the third-layer coil conductors 18, each U-shaped bottom part 18b is disposed on the side facing the corresponding pole core 15 in the axial direction. On the other hand, for the second-layer coil conductor 18, each U-shaped bottom part 18b is disposed on the side opposite to the corresponding pole core 15 in the axial direction. The bent portion 18c provided in the U-shaped bottom part 18b of the first-layer coil conductor 18 is disposed within the stepped space that occurs due to the difference in internal diameter between the first magnetic path part and the second magnetic path part of the yoke 14 (see FIG. 2). Specifically, the bent portion 18c is disposed in the space formed at the inner circumference of the extended part 14c of the outer yoke 14a. When the space defined by the U-shaped bottom part 18 and the inter-core conductors 18a which are axially opposite to this U-shaped bottom part 18 is referred to as a U-shaped space, the bent portion 18c provided in the U-shaped bottom part 18b of the second-layer coil conductor 18 is located in the U-shaped space of the third-layer coil conductor 18. Likewise, the bent portion 18c provided in the U-shaped bottom part 18b of the third-layer coil conductor 18 is located in the U-shaped space of the second-layer coil conductor 18.

The drawing member 20 is a plate-like member made of conductive material such as copper. As shown in FIG. 2, the drawing member 20 is held by a grommet 21 made of rubber, and fitted to the yoke 14. One end of the drawing member 20 is drawn from the grommet 21 to the outside of the yoke 14, and connected to an M-terminal bolt 23 of the electromagnetic switch 5 through a motor lead 22. The other end of the drawing member 20 is drawn from the grommet 21 to the inside of the yoke 14, and joined to the fusion member 19. The fusion member 19 is a plate-like member made of material (steel, for example) whose resistance is higher than those of the materials of the drawing member 20 and the coil conductors 18. As shown in FIG. 7, the fusion member 19 includes a minimum cross-section part 19a between its upstream and downstream ends at which the cross sectional area thereof becomes minimum.

The first embodiment of the invention provides the following advantages.

1) Each of the coil conductors 18 of the respective layers constituting the field conductor includes the inter-core conductors 18a each disposed so as to extend in the axial direction between the adjacent two pole cores 15. The inter-core conductor 18a is formed by integrating the conductor part for generating magnetic field to be applied to one of the adjacent pole cores 15 and another conductor part for generating magnetic field to be applied to the other pole core 15. The circumferential width of the inter-core conductor 18a is approximately the same as the circumferential distance between the adjacent pole cores 15. According to this configuration, since it is not necessary to take into consideration interference between the conductor part that generates magnetic field to be applied to the one pole core 15 and another conductor part that generates magnetic field to be applied to the other pole core 15, the inter-pole conductor 18a can be disposed utilizing a dead space for avoiding the interference. Therefore, since the winding space provided between the two adjacent pole cores 15 can be used effectively, the space factor between the two adjacent pole cores 15 can be increased. As a result, the motor 2 can be made to be compact in size and to output high power.

2) The coil conductor 18 of each layer is disposed such that the U-shaped bottom parts 18b are located on the front side and the rear side alternately. That is, the coil conductor 18 of each layer has a shape that meanders around the pole cores 15. The second-layer coil conductor 18 is disposed such that the U-shaped bottom parts 18b thereof are located on the side opposite to the first-layer coil conductor 18 and the third-layer coil conductor 18 in the axial direction. According to this configuration, since the U-shaped bottom parts 18b do not concentrate on one side of the pole cores 15 in the axial direction, and accordingly the magnetic flux distribution can be made uniform, the motor 2 can be made to be compact in size and to output high power. In addition, since the U-shaped bottom parts 18b of one coil conductor 18 do not overlap with the U-shaped bottom parts 18b of another coil conductor 18 which are adjacent to each other in the stacked direction, it is possible to prevent occurrence of a short circuit between the U-shaped bottom parts 18b due to poor insulation therebetween even when the motor 2 is supplied continuously with a large current.

3) The U-shaped bottom parts 18b of each coil conductor 18 are bent at their axial ends. Accordingly, the axial length of the coil conductors 18 can be reduced without increasing their electrical resistance. For example, if the axial width of the U-shaped bottom parts 18b is reduced smaller than the circumferential width of the inter-core conductors 18a instead of bending the ends of the U-shaped bottom parts 18b, the resistance of the U-shaped bottom parts 18b increases, causing the heat generation amount to increase. According to this embodiment in which the U-shaped bottom parts 18b of each coil conductor 18 are bent at their axial ends, since their resistance does not increase, the motor 2 can be made compact without sacrificing the heat-resisting property.

4) The first-layer coil conductor 18 disposed on the outermost side in the stacked direction is disposed such that the bent portion 18c of each U-shaped bottom part 18b is located within the stepped space of the yoke 14. Accordingly, it is possible to prevent occurrence of a short circuit between the yoke 14 and the bent portion 18c even when the motor 2 is supplied continuously with a large current.

5) The yoke 14 is constituted of the outer yoke 14a and the inner yoke 14b which are joined on top of each other in the radial direction. The outer yoke 14a and the inner yoke 14b are manufactured individually by rounding each of two steel plates into a cylindrical shape. According to this configuration, the yoke 14 can be manufactured at a low cost compared to a case where the yoke 14 is manufactured by rounding a thick steel plate into a cylindrical shape. In addition, since the axial length of the inner yoke 14b is smaller than that of the outer yoke 14a, the stepped space can be formed at the inner circumference of the extended part 14c of the outer yoke 14a simply by overlapping the outer yoke 14a and the inner yoke 14b on each other in the radial direction. That is, the stepped space can be formed without cutting work.

6) The coil conductor 18 of each layer includes the four inter-core conductors 18a each disposed adjacent two of the pole cores 15, the four inter-core conductors 18a being connected in series through the U-shaped bottom parts 18b. The field conductor is formed by series-connecting the coil conductors 18 of the respective layers, which are stacked in the radial direction. According to this configuration, a high torque performance can be obtained with the small number of the layers. Therefore, according to this embodiment, since the number of insulating films or insulating members for insulation between the adjacent layers can be reduced, it possible to increase the space factor to thereby reduce the size of the motor 2.

7) The coil conductors 18 are formed using plate members having a rectangular cross-sectional shape. Accordingly, since the space factor can be increased, the motor 2 can be made to be compact in size and to output higher power compared to a case where coil conductors 18 are formed using round wires.

8) The inter-core conductors 18a of the radially outer one of the adjacent coil conductors 18 are larger in circumferential width than those of the radially inner one of the adjacent coil conductors 18. That is, since the circumferential width of the inter-core conductors 18a is set depending on the circumferential distance between the pole cores 15 which are adjacent to each other in the circumferential direction, it is possible to prevent occurrence of an unnecessary space between the adjacent pole cores to thereby increase the space factor. The radially outer coil conductor 18 is smaller in radial thickness (plate thickness) than the radially inner coil conductor 18. Accordingly, it is possible to reduce the difference in cross sectional are between the adjacent coil conductors 18 although they are different in circumferential width from each other. For example, although the circumferential width of the inter-core conductors 18a of the first-layer coil conductor 18 is larger than that of the second-layer coil conductor 18, since the plate thickness of the inter-core conductors 18a of the second-layer coil conductor 18 is larger than that of the first-layer conductor layer 18, the difference in cross-sectional area therebetween can be made small. Therefore, since the coil conductors 18 of the respective layers can be uniformed in heat generation amount, and accordingly, the heat generation amount of a portion that generates heat most can be reduced, the heat resistance performance of the motor 2 can be increased. 9) Between the first-layer coil conductor 18 and the drawing member 20, there is provided the fusion member 19 whose resistance is higher than those of the first layer coil conductor 18 and the drawing member 20. Accordingly, even if an unexpected large current flows continuously through the motor 2, the motor 2 can be protected because the minimum cross-section part 19a of the fusion member 19 fuses immediately.

10) The coil conductors 18 of the respective layers can be formed by edgewise-winding conductive plate members having a rectangular cross section. In this case, the developed shapes of the coil conductors 18 as shown in FIG. 1 can be molded continuously.

11) The coil conductors 18 of the respective layers may be formed by cutting and pressing conductive plate members. In this case, the developed meandering shapes of the coil conductors 18 as shown in FIG. 1 can be molded easily.

12) The coil conductors 18 of the respective layers may be applied with insulating powder made of resin at their surfaces to be insulation-coated after being molded into the shapes as shown in FIG. 1. In this case, the coil conductors 18 can be formed by simple cutting and pressing processes.

13) The configuration of the first embodiment achieves the high space factor with the small number of the coil turns per pole Accordingly, the motor 2 according to the first embodiment is suitable for a starter motor that operates on low-voltage and large-current power.

Next, other embodiments of the invention are described. In the following embodiments, the parts, portions or components that are the same as or equivalent to those of the first embodiment in structure are indicated by the same reference numerals or characters.

Second Embodiment

Figure 8:
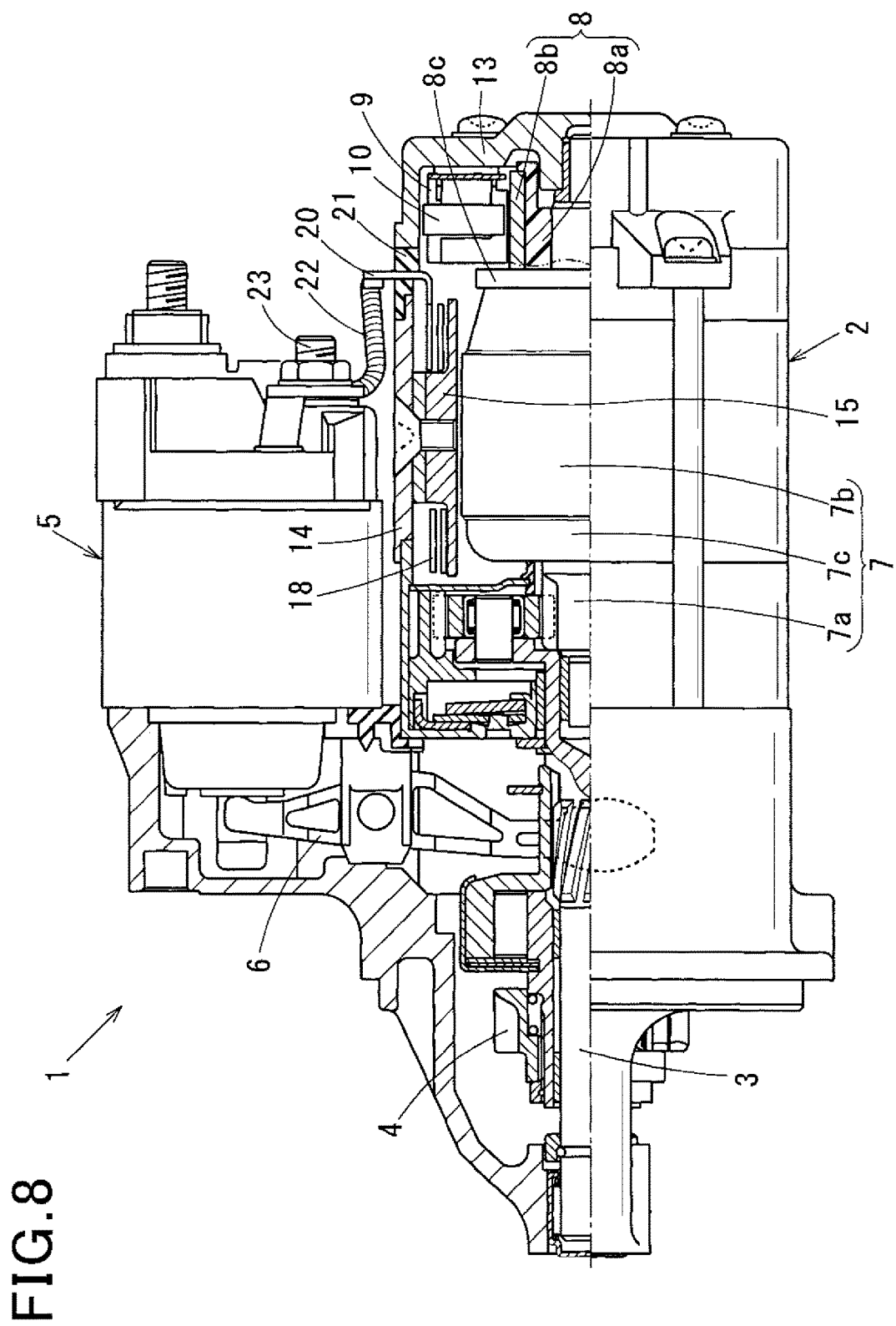
FIG. 8 is a cross-sectional view of a starter including a starter motor as a DC motor according to a second embodiment of the invention.

FIG. 8 is a cross-sectional view of a starter including a starter motor as a DC motor according to a second embodiment of the invention. In the second embodiment, an even number (four in this embodiment) of the layers of the coil conductors 18 are stacked in the radial direction. In the second embodiment, the coil conductors 18 are disposed such that, for the same pole core 15, the U-shaped bottom parts 18 of two of the four coil conductors 18 are located on the side axially opposite to those of the other two pole cores 18. In FIG. 8, the four coil conductors 18 are shown such that their axial orientations alternate in the stacking direction. However, they may be disposed such that the two coil conductors 18 which are adjacent in the stacking direction are the same in the axial orientation as each other. For example, the axial orientation of the first-layer and the second-layer coil conductors 18 may be opposite to that of the third-layer and the fourth-layer coil conductors 18. Alternatively, the axial orientation of the second-layer and the third-layer coil conductors 18 may be opposite to that of the first-layer and the fourth-layer coil conductors 18. The second embodiment provides advantages similar to those provided by the first embodiment.

Other Embodiments

In the first embodiment, the yoke 14 is comprised of the outer yoke 14a and the inner yoke 14b. That is, in the first embodiment, the first magnetic path part and the second magnetic path part are formed by joining two steel plates on top of each other. However, the first magnetic path part and the second magnetic path part may be formed of a single steel plate. The motor 2 of the first embodiment is a 4-pole DC motor. However, the present invention can be used for a 6-pole DC motor. In the first embodiment, the field conductor is formed by series-connecting the coil conductors 18 of the respective layers. However, the coil conductors 18 of the respective layers do not necessary have to be connected in series. They may be connected in double parallel so as to constitute the field conductor.

In the first embodiment, the four inter-core conductors 18*a* are joined in series through the U-shaped bottom parts 18*b* each disposed between the adjacent pole cores 15 to form the coil conductor 18. However, the first embodiment may be modified such that separated coil conductors are electrically connected so as to form the coil conductor 18. In the first embodiment, the end of each of the U-shaped bottom parts 18*b* of the coil conductor 18 is bent to form the bent portion 18*c*. However, the end of each of the U-shaped bottom parts 18*b* of the coil conductor 18 may not be bent as is the case with the second embodiment.

The above explained preferred embodiments are exemplary of the invention of the present application which is described solely by the claims appended below. It should be understood that modifications of the preferred embodiments may be made as would occur to one of skill in the art.

What is claimed is:

1. A DC motor comprising:
   a cylindrical yoke constituting a magnetic path;
   pole cores fixed to an inner periphery of the yoke so as to be arranged at even intervals along a circumferential direction of the yoke; and
   a field conductor that generates a magnetic field to magnetize the pole cores when supplied with a current,
   wherein the field conductor includes inter-core conductors, each of which extends in an axial direction of the yoke so as to be disposed between the circumferentially adjacent pole cores,
   each of the inter-core conductors being formed by integrating a first conductor part that generates a magnetic field to be applied to one of the circumferentially adjacent pole cores and a second conductor part that generates a magnetic field to be applied to the other of the circumferentially adjacent pole cores, and
   wherein the field coil includes coil conductors, each of which is comprised of the circumferentially adjacent inter-core conductors which are joined in a U-shape, the field coil being formed as layers of the coil conductors stacked in a radial direction of the yoke or a layer-stacking direction.

2. The DC motor according to claim 1, wherein
   each of the pole cores includes a brim part that projects in the circumferential direction at an end thereof radially opposite to the yoke,
   at least one of the inter-core conductors has a circumferential width larger than a circumferential distance between the brim parts of the adjacent pole cores, and is disposed such that one circumferential end thereof circumferentially overlaps with the brim part of one of the adjacent pole cores and the other circumferential end thereof circumferentially overlaps with the brim part of the other of the adjacent pole cores.

3. The DC motor according to claim 1, wherein at least one of the inter-core conductors has a circumferential width which is the same as a circumferential distance between the adjacent pole cores.

4. The DC motor according to claim 1, wherein each of the coil conductors includes U-shaped bottom parts, each of which joins the circumferentially adjacent inter-core conductors in a U-shape, the circumferentially adjacent U-shaped bottom parts being located axially opposite to each other across the pole core located therebetween.

5. The DC motor according to claim 4, wherein the U-shaped bottom part of the coil conductor of one of the stacked layers is axially opposite to the U-shaped bottom part of the coil conductor of another one of the stacked layers across a same one of the pole cores.

6. The DC motor according to claim 5, wherein the number of the stacked layers is even, and the coil conductors are disposed such that the U-shaped bottom parts of the coil conductors of half of the stacked layers are located axially opposite to the U-shaped bottom parts of the coil conductors of the other half of the stacked layers across a same one of the pole cores.

7. The DC motor according to claim 5, wherein the number of the stacked layers is odd, and a difference between the number of stacked layers of the coil conductors whose U-shaped bottom parts are located at one axial end and the number of the stacked layers of the coil conductors whose U-shaped bottom parts are located at the other axial end with respect to a same one of the pole cores is equal to one.

8. The DC motor according to claim 4, wherein for two of the stacked layers that are adjacent in the layer-stacking direction, the U-shaped bottom parts of the coil conductors on a radially inner side and the U-shaped bottom parts of the coil conductors on a radially outer side are axially opposite to each other with respect to a same one of the pole cores.

9. The DC motor according to claim 4, wherein the yoke includes a first magnetic path part forming a magnetic path between the circumferentially adjacent pole cores and a second magnetic path part forming a magnetic path axially outside the pole cores, the second magnetic path part being larger in inner diameter and smaller in plate thickness than the first magnetic path part so that a step is formed between the first magnetic path part and the second magnetic path part.

10. The DC motor according to claim 9, wherein
    the yoke includes an outer yoke and an inner yoke which are joined on top of each other in the radial direction, the inner yoke being smaller in axial length than the outer yoke,
    an area in which the outer yoke and the inner yoke are overlapped with each other forms the first magnetic path part, and
    an extended part of the outer yoke axially projecting from both ends of the inner yoke forms the second magnetic path part.

11. A method of manufacturing the DC motor recited in claim 10, comprising the steps of:
    forming the outer yoke by rounding a steel plate into a cylindrical shape;
    forming the inner yoke by rounding a steel plate into a cylindrical shape; and
    joining the outer yoke and the inner yoke on top of each other.

12. The method of manufacturing the DC motor according to claim 11, further comprising the step of molding the coil conductors by edgewise-winding conductive plate members having a rectangular cross sectional shape.

13. The method of manufacturing the DC motor according to claim 12, further comprising the step of coating the molded coil conductors with an insulating member.

14. The method of manufacturing the DC motor according to claim 11, further comprising the step of molding the coil conductors by cutting and pressing conductive plate members.

15. The DC motor according to claim 9, wherein the second magnetic path part is radially opposite to the U-shaped bottom parts of the coil conductor of a radially outermost one of the stacked layers.

16. The DC motor according to claim 9, wherein the coil conductor of a radially outermost one of the stacked layers includes a thick part formed in each U-shaped bottom part thereof, the thick part being larger in radial thickness than the inter-core conductors, the thick part being located in a stepped space that occurs due to difference in internal diameter between the first magnetic path part and the second magnetic path part.

17. The DC motor according to claim 4, wherein an axial width of the U-shaped bottom parts of at least one of the coil conductors is smaller than a circumferential width of the inter-core conductors.

18. The DC motor according to claim 4, wherein, when a space defined by one of the U-shaped bottom parts and the circumferentially adjacent inter-core conductors that are axially opposite to the one of the U-shaped bottom parts is referred to as a U-shaped space, at least one of the coil conductors includes a thick part formed in each U-shaped bottom part thereof, the thick part being larger in radial thickness than the inter-core conductors, and located in the U-shaped space of another one of the coil conductors that is adjacent in the layer-stacking direction to the one of the coil conductors.

19. The DC motor according to claim 18, wherein the thick part is formed by bending the U-shaped bottom part.

20. The DC motor according to claim 1, wherein in at least one of the coil conductors, all of the inter-core conductors each disposed between the adjacent pole cores are series-connected through the U-shaped bottom parts.

21. The DC motor according to claim 1, wherein at least two of the coil conductors which are adjacent in the layer-stacking direction are connected in series.

22. The DC motor according to claim 1, wherein all of the stacked layers of the coil conductors are connected in series.

23. The DC motor according to claim 1, wherein each of the coil conductors has a rectangular cross sectional shape.

24. The DC motor according to claim 1, wherein
each of the pole cores has a circumferential width which is constant from one end thereof on a side facing the yoke to the other end thereof on a side opposite to the yoke or which is smaller at the one end than at the other end, and for each two of the coil conductors which are adjacent to each other in the radial direction as the layer-stacking direction, a circumferential width of the inter-core conductors of the radially outer coil conductor is larger than a circumferential width of the inter-core conductors of the radially inner coil conductor.

25. The DC motor according to claim 24, wherein a thickness in the layer-stacking direction of the inter-core conductors of the radially outer coil conductor is smaller than a thickness in the layer-stacking direction of the inter-core conductors of the radially inner coil conductor.

26. The DC motor according to claim 1, further comprising a drawing member which is held by an insulating member and fitted to the yoke for supplying a current to the field conductor from outside the yoke, and a fusion member which has a resistance higher than the drawing member and the field conductor and is provided in an current path between the drawing member and the field conductor.

27. A starter for starting an internal combustion engine, wherein the starter includes the DC motor recited in claim 1 as a starter motor thereof.

* * * * *